United States Patent

Fujita et al.

[11] Patent Number: 5,275,993
[45] Date of Patent: Jan. 4, 1994

[54] OLEFIN POLYMERIZATION CATALYST

[75] Inventors: Takashi Fujita; Kazuyo Kitagawa, both of Yokkaichi, Japan

[73] Assignee: Mitsubishi Petrochemical Company Limited, Tokyo, Japan

[21] Appl. No.: 903,963

[22] Filed: Jun. 26, 1992

[30] Foreign Application Priority Data

Jun. 28, 1991 [JP] Japan .................... 3-158919

[51] Int. Cl.$^5$ .............................. C08F 4/649
[52] U.S. Cl. ...................... 502/127; 502/103; 502/109; 502/115; 502/125; 526/125
[58] Field of Search ............. 502/103, 109, 115, 125, 502/127

[56] References Cited

U.S. PATENT DOCUMENTS

| | | | |
|---|---|---|---|
| 3,925,338 | 12/1975 | Ort .................... | 502/103 X |
| 4,780,443 | 10/1988 | Matsuura et al. ........... | 502/125 X |
| 4,814,314 | 3/1989 | Matsuura et al. ........... | 502/112 |
| 4,822,763 | 4/1989 | Matsurra et al. ........... | 502/113 |
| 4,904,630 | 2/1990 | Matsuura et al. ........... | 502/125 X |
| 4,940,682 | 7/1990 | Sasaki et al. ............. | 502/109 X |
| 4,985,515 | 1/1991 | Matsuura et al. ........... | 502/108 X |
| 5,032,562 | 7/1991 | Lo et al. ................ | 502/111 |
| 5,032,563 | 7/1991 | Matsuura et al. ........... | 502/125 X |
| 5,082,818 | 1/1992 | Matsuura et al. ........... | 502/119 |
| 5,104,838 | 4/1992 | Fujita et al. ............. | 502/108 |
| 5,112,786 | 5/1992 | Fujita .................. | 502/119 |
| 5,147,839 | 9/1992 | Fujita et al. ............. | 502/125 X |
| 5,162,442 | 11/1992 | Matsuura et al. ........... | 525/247 |
| 5,162,443 | 11/1982 | Matsuura et al. ........... | 525/247 |

FOREIGN PATENT DOCUMENTS

| | | |
|---|---|---|
| 0131832 | 1/1985 | European Pat. Off. . |
| 0168317 | 1/1986 | European Pat. Off. . |
| 0283011 | 9/1988 | European Pat. Off. . |
| 0314131 | 5/1989 | European Pat. Off. . |

Primary Examiner—Patrick P. Garvin
Attorney, Agent, or Firm—Oblon, Spivak, McClelland, Maier & Neustadt

[57] ABSTRACT

An olefin polymerization catalyst which is obtained by contacting the following components (A) and (B): component (A): a product of contacting the following components ($A_1$) and ($A_2$):

component ($A_1$): polyolefin powder having specific values of pore diameter, pore volume, average pore diameter and average particle diameter, component ($A_2$): a solid component for a Ziegler catalyst comprising titanium, magnesium and a halogen as the essential components;

component (B): an organoaluminum compound.

The supporting state of the catalyst is improved, and a contaminant-free polymer having a satisfactorily large particle diameter without the lowering of the activity or the stereoregularity of the catalyst is successfully obtained.

16 Claims, No Drawings

OLEFIN POLYMERIZATION CATALYST

BACKGROUND OF THE INVENTION

1. Field of the Invention

The present invention relates to an olefin polymerization catalyst. More particularly, the present invention relates to an olefin polymerization catalyst which exhibits high activity on its application to the polymerization of olefins and makes it possible to produce a polymer having high stereoregularity and a large particle diameter.

2. Description of the Prior Art

Hitherto proposed olefin polymerization catalysts comprising a solid catalyst component containing titanium, magnesium and a halogen as the essential components and an organoaluminum compound exhibit high activities and high stereoregularities. However, polymers obtained through their use generally have unsatisfactory average particle diameter and thus are required to be subjected to granulation process in the final step of the polymerization process. The elimination of the granulation process should drastically improve the production efficiency and thus successfully decrease the production cost.

In the polymerization without the use of a solvent, the increment of the polymerization amount of a rubber component primarily comprising a propylene-ethylene copolymer during the production of a propylene block copolymer by stepwise polymerization including the copolymerization with a small amount of ethylene often gives rise to deterioration of fluidity due to the adhesion of polymer particles and causes a very serious operational problem. The problem is believed to be mitigated by sufficiently increasing the particle diameter of the polymer particles. The overcoming of this problem indicates that a block copolymer having a high content of a rubber copolymer, the production of which the production has hitherto been considered very difficult or almost impossible, can be readily produced. Thus, it is desirable to develop a series of highly active and highly stereoregular catalysts which afford polymer particles having a sufficient particle diameter for accomplishing the above described object.

It is believed that a catalyst having a particle diameter corresponding to a granular polymer having a large particle diameter is required for the production of the granular polymer. In the case of a catalyst having a magnesium compound and a titanium compound as the essential components, a method of first preparing magnesium containing particles having satisfactorily large particle diameters is known as one of the aforementioned concept. For instance, Japanese Patent Publication No. 45643/1986 discloses a method of granulation by melting a dihalogenated magnesium compound and spraying it into a desired particle state. Japanese Patent Laid-Open Publication No. 29591/1980 discloses a method of obtaining the desired particle state by forming an emulsion of a melt comprising a dihalogenated magnesium and an alcohol together with an inert medium and cooling it into a solid.

The afornentioned proposals however require large expenditures for equipment and produce a catalyst having a low activity per catalyst containing magnesium containing particles which have satisfactorily large diameters. Thus these proposals are considered to still have points to be improved. As an alternative method, the method for preparing a catalyst having a desired particle diameter by separately providing particles other then dihalogenated magnesium containing particles for a support having a sufficient diameter and supporting a catalyst on the particles is described in Japanese Patent Laid-Open Publication Nos. 98604/1989 or 97508/1990 and in U.S. Pat. No. 4,940,682. These catalysts, however, have unsatisfactory activity per catalyst containing the support particles, or may cause problems such as fish-eye during molding since the support particles are particles of a divinylbenzene-styrene copolymer which may be crosslinked.

The present invention seeks to solve problems such as those encountered in the prior art.

SUMMARY OF THE INVENTION

An object of the present invention is to provide a solution to the aforementioned problems by using a specific support for catalyst.

That is, the olefin polymerization catalyst according to the present invention is characterized in that the catalyst is obtained by contacting the following components (A) and (B):

component (A): a product of contacting the following components ($A_1$) and ($A_2$):

component ($A_1$): polyolefin powder having a pore diameter distribution in the range of 75 to 10,000 Å, a pore volume in the range of 0.1 to 3.0 cc/g, an average pore diameter in the range of 300 to 5,000 Å as measured with a porosimeter and an average particle diameter in the range of 50 to 1,000 µm, and being completely soluble in toluene at 70° C.

component ($A_2$): a solid component for Ziegler catalyst containing titanium, magnesium and a halogen as the essential components;

component (B): an organoaluminum compound.

The olefin polymerization catalyst of the present invention is a catalyst in which the use of a polyolefin powder having a sufficiently large pore volume as the support for catalyst improves the supporting state of the catalyst and produces a contaminant free polymer of a satisfactorily large particle diameter without the lowering of the activity or the stereoregularity of the catalyst containing particles for support. Thus the problems accompanying the well-known catalysts are eliminated.

These features of the olefin polymerization catalyst of the present invention are very advantageous in industrial production and important as the features of the catalyst. The expression of such effects, the reason for which has not yet been completely elucidated, is probably due to the ideal shape of the pores of the porous support polyolefin powder for supporting the catalyst used in the present invention and thus the adsorption or deposition of the solid catalyst component within the whole of the particles for support.

A polymer having a sufficiently large particle diameter which is obtained by using the olefin polymerization catalyst of the present invention makes it possible to eliminate the granulation step from the post-polymerization process in industrial production and advantageously increase the content of a rubber copolymer during the production of a propylene block copolymer.

Furthermore, polyolefin powder which may act as a carrier or support of a Ziegler catalyst is advantageous in that it can support a catalyst in an amount higher than that supported by a known divinylbenzene-styrene copolymer, whereby it may be possible to increase the catalyst activity, a bulk density of a polymer thereby obtained, and the like.

DETAILED DESCRIPTION OF THE INVENTION

[I] Olefin Polymerization Catalyst

The olefin polymerization catalyst according to the present invention is obtained by contacting specific components (A) and (B). The phraseology "obtained by contacting" herein does not mean that the substances to be contacted are limited to the components described above but may include other appropriate components.

Component (A)

The component (A) of the catalyst of the present invention comprises the contact product of the following components ($A_1$) and ($A_2$). The term "comprises" herein does not mean that the components are limited to those described above but may include appropriate third components.

Component ($A_1$)

The component ($A_1$) is a polyolefin powder which satisfies the specified requirements in relation to the particle diameter and the pore diameter.

That is, the polyolefin powder used for the component ($A_1$) has a pore diameter distribution in the range of 75 to 10,000 Å, preferably 100 to 5,000 Å, a pore volume in the range of 0.1 to 3.0 cc/g, preferably 0.5 to 2.5 cc/g, and an average pore diameter in the range of 300 to 5,000 Å, preferably 500 to 3,000 Å as measured with a porosimeter such as PORESIZER 9310 manufactured by Shimadzu Seisakusho, Ltd. If the polyolefin powder has a pore volume less than 0.1 cc/g and/or an average pore diameter less than 300 Å, the catalyst component will be supported insufficiently on the polyolefin powder to obtain the objective product.

Furthermore, the polyolefin powder should have an average particle diameter in the range of 50 to 1,000 μm, preferably 100 to 700 μm. The term "average particle diameter" herein indicates that measured by image analysis of a polyolefin powder photogram, specifically measured by a "SPIKA II" manufactured by NIPPON AVIONICS. If the polyolefin powder has an excessively small particle diameter, the effect of the production of a large particle diameter will be lowered. On the other hand, if the polyolefin powder has an excessively large particle diameter, the catalyst will tend to exhibit an unsatisfactory activity.

As the specific examples of the polyolefin powder used for the component ($A_1$) of the present invention, there are, first of all, homopolymers or copolymers of α-olefins having 2 to 10 carbon atoms, preferably 2 to 6 carbon atoms, such as an ethylene homopolymer, an ethylene-propylene copolymer, a propylene homopolymer, an ethylene-butene-1 copolymer, an ethylene-hexene-1 copolymer, a propylene-butene-1 copolymer, a propylene-hexene-1 copolymer, and a propylene-4-methylpentene-1 copolymer.

Among these polyolefin powders, the preferred ones are powders of ethylene homopolymers and copolymers and propylene homopolymers or copolymers, particularly ethylene homopolymers, ethylene-propylene copolymers and propylene homopolymers, propylene homopolymer being most preferable.

The polyolefin powders used in the present invention are completely soluble in toluene at 70° C. since the polyolefin is not crosslinked.

These polyolefin powders must have the stated porosity according to the present invention. When the porosity prescribed according to the present invention is not realized upon molding of the polymer or during polymerization, it must be imparted to the polymer by a measure such as extraction with a solvent or grinding. The extraction with a solvent is to modify the surface of particles of the polyolefin powder to meet the requirements such as a pore volume. The extraction with a solvent can be practised in any way as far as the modification of particles is obtained to a desired level, but the following amy be preferable. Solvents used are any inert solvents to the polymer, and include hydrocarbons solvents such as n-hexane, n-heptane, n-octane, isooctane, n-decane and benzene and halocarbon such as 1,2-dichloroethane, butyl chloride and butyl bromide. Among these, hydrocarbon solvents are preferable, and hydrocarbons of 6 to 12 carbon atoms such as a mixture of n-heptane and n-octance are more preferable. The amount of a solvent may be such that 1 liter of a solvent is used for 0.1 to 100 g, preferably 1 to 50 g, of polymer powder. The temperature of the extraction treatment is preferably 0° C. to 150° C., preferably 30° C. to 100° C. The time for the extraction treatment should be such that the polyolefin powder will acquire the requirements in terms of a particle size and a pore size and may depend on the type of a solvent used for a given polyolefin powder, but may usually be 10 minutes to 2 hours.

Component ($A_2$)

The component ($A_2$) is a solid component for a Ziegler type catalyst containing as its essential components titanium, magnesium and a halogen. The phraseology "containing as the essential components" means that: the other appropriate elements may be contained in addition to the above described three components; these components may be present independently in the form of any appropriate compounds; and these elements may be present as those which are bonded to each other.

The solid component containing titanium, magnesium and a halogen itself is well-known, and the components described in Japanese Patent Laid-Open Publication Nos. 45688/1978, 3894/1979, 31092/1979, 39483/1979, 9459/1979, 118484/1979, 131589/1979, 75411/1980, 90510/1980, 90511/1980, 127405/1980, 147507/1980, 155003/1980, 18609/1981, 70005/1981, 72001/1981, 86905/1981, 90807/1981, 155206/1981, 3803/1982, 34103/1982, 92007/1982, 121003/1982, 5309/1983, 5310/1983, 5311/1983, 8706/1983, 27732/1983, 32604/1983, 32605/1983, 67703/1983, 117206/1983, 127708/1983, 183709/1983, 149905/1984 and 149906/1984 are used.

Examples of magnesium compounds as the magnesium source used in the present invention are a magnesium halide, a dialkoxymagnesium, an alkoxymagnesium halide, a magnesium oxyhalide, a dialkylmagnesium, magnesium oxide, magnesium hydroxide, and a magnesium carbonate. Among these compounds a magnesium halide is preferred.

Titanium compounds that are suitable as the titanium source include the compounds represented by the formula $Ti(OR^1)_{4-n}X_n$, wherein $R^1$ represents a hydrocarbyl group, preferably having 1 to ca. 10 carbon atoms, X represents halogen and n denotes a numeral in the range of $0 \leq n \leq 4$. Specific examples of the titanium compound are TiCl$_4$, TiBr$_4$, Ti(OC$_2$H$_5$)Cl$_3$, Ti-(OC$_2$H$_5$)$_2$Cl$_2$, Ti(OC$_2$H$_5$)$_3$Cl, Ti(O-iC$_3$H$_7$)Cl$_3$, Ti(O-nC$_4$H$_9$)Cl$_3$, Ti(O-nC$_4$H$_9$)$_2$Cl$_2$, Ti(OC$_2$H$_5$)Br$_3$, Ti-(OC$_2$H$_5$)(OC$_4$H$_9$)$_2$Cl, Ti(O-nC$_4$H$_9$)$_3$Cl, Ti(O-C$_6$H$_5$)Cl$_3$, Ti(O-iC$_4$H$_9$)$_2$Cl$_2$, Ti(OC$_5$H$_{11}$)Cl$_3$, Ti(OC$_6$H$_{13}$)Cl$_3$, Ti-(OC$_2$H$_5$)$_4$, Ti(O-nC$_3$H$_7$)$_4$, Ti(O-nC$_4$H$_9$)$_4$, Ti(O-iC$_4$H$_9$)$_4$, Ti(OC$_6$H$_{13}$)$_4$, Ti(O-nC$_8$H$_{17}$)$_4$, and Ti-[OCH$_2$CH(C$_2$H$_5$)C$_4$H$_9$]$_4$. Among them, TiCl$_4$, Ti(O-C$_4$H$_9$)$_4$, Ti(O-C$_2$H$_5$)$_4$, Ti(O-C$_4$H$_9$)Cl$_3$ are preferable.

Moreover, molecular compounds obtained by reacting TiX'$_4$, wherein X' represents halogen, with an electron donor described later can also be used. Specific examples of the molecular compounds are TiCl$_4$.CH$_3$COC$_2$H$_5$, TiCl$_4$.CH$_3$CO$_2$C$_2$H$_5$, TiCl$_4$.C$_6$H$_5$NO$_2$, TiCl$_4$.CH$_3$COCl, TiCl$_4$.C$_6$H$_5$COCl, TiCl$_4$.C$_6$H$_5$CO$_2$C$_2$H$_5$, TiCl$_4$.ClCOC$_2$H$_5$, and TiCl$_4$.C$_4$H$_4$O.

While the halogen source is ordinarily supplied from the aforementioned magnesium and/or titanium halides, it can also be supplied from well-known halogenating agents such as aluminum halides, silicon halides or phosphorous halides.

It is acceptable that the solid component for use in the present invention comprises, other than the abovedescribed essential components, other components such as polymeric silicon compounds, boron compounds such as B(OCH$_3$)$_3$, B(OC$_2$H$_5$)$_3$, B(OC$_6$H$_5$)$_3$, etc., and the like.

As the polymeric silicon compound, compounds represented by the following formula are suitable:

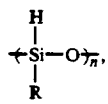

wherein R is a hydrocarbyl group having approximately 1 to 10 carbon atoms, and n represents such a polymerization degree that the polymeric silicon compound has a viscosity of approximately 1 to 10 centistokes.

Of these, methylhydrogenpolysiloxane, 1,3,5,7-tetramethyloyclotetrasiloxane, 1,3,5,7,9-pentamethylcyclopentasiloxane, ethylhydrogenpolysiloxane, phenylhydrogenpolysiloxane, cyclohexylhydrogenpolysiloxane, and the like are preferred.

The halogen contained in the catalyst component may be fluorine, chlorine, bromine or iodine or a mixture thereof, preferably chlorine.

Modification

The solid component used in the present invention, as described above, allows the coexistence of the components other than the essential components described above. Typical examples of the components which can coexist with the essential components are the following electron donors, silicon compounds, vinylsilane compounds and organoaluminum compounds.

(i) Electron Donors

Specific examples of the electron donors (in this connection, such an electron donor as that added during the preparation of a transition metal component of a Ziegler type catalyst is sometimes called an internal donor), are oxygen-containing electron donors such as alcohols, phenols, ketones, aldehydes, carboxylic acids, esters of organic acids or inorganic acids, ethers, acid amides, acid anhydrides, nitrogen containing electron donors such as ammonia, amines, nitriles, and isocyanates.

More specifically, examples of such electron donors are (a) alcohols having 1 to 18 carbon atoms such as methanol, ethanol, propanol, pentanol, hexanol, octanol, dodecanol, octadecyl alcohol, benzyl alcohol, phenylethyl alcohol, cumyl alcohol, isopropylbenzyl alcohol and the like; (b) phenols having 6 to 25 carbon atoms which may have alcohols such as phenol, cresol, xylenol, ethylphenol, propylphenol, cumylphenol, nonylphenol, naphthol and the like; (c) ketones having 3 to 15 carbon atoms such as acetone, methyl ethyl ketone, methyl isobutyl ketone, acetophenone, benzophenone and the like; (d) aldehydes having 2 to 15 carbon atoms such as acetaldehyde, propionaldehyde, octylaldehyde, benzaldehyde, tolualdehyde, naphthoaldehyde and the like; (e) organic acid esters having 2 to 20 carbon atoms such as methyl formate, methyl acetate,. ethyl acetate, vinyl acetate, propyl acetate, octyl acetate, cyclohexyl acetate, Cellosolve acetate, ethyl propionate, methyl butylate, ethyl valerate, ethyl stearate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, Cellosolve benzoate, methyl toluate, ethyl toluate, amyl toluate, ethyl ethylbenzoate, methyl anisate, ethyl anisate, ethyl ethoxybenzoate, diethyl phthalate, dibutyl phthalate, diheptyl phthalate, γ-butyrolactone, α-valerolactone, coumarin, phthalide, ethylene carbonate and the like; (f) inorganic acid esters such as ethyl silicate, butyl silicate, phenyltriethoxysilane and the like; (g) halides having 2 to 15 carbon atoms such as acetyl chloride, benzoyl chloride, toluyl chloride, anisyl chloride, phthaloyl chloride, iso-phthaloyl chloride and the like; (h) ethers having 2 to 20 carbon atoms such as methyl ether, ethyl ether, isopropyl ether, butyl ether, amyl ether, tetrahydrofuran, anisole, diphenyl ether and the like; (i) acid amides such as acetamide, benzamide, toluamide and the like; (j) amines such as methylamine, ethylamine, diethylamine, tributylamine, piperidine, tribenzylamine, aniline, pyridine, picoline, tetramethylethylenediamine and the like; and (k) nitriles such as acetonitrile, benzonitrile, and tolunitrile. These electron donors can be used in combinations of the two or more thereof.

Among these electron donors, the organic esters and acid halides, particularly phthalic acid esters, Cellosolve acetate and phthaloyl halides are preferred.

(ii) Silicon Compounds

Next, the above mentioned silicon compound is a silicon compound represented by the formula R$^2$$_p$X$_q$Si(OR$^3$)$_{4-p-q}$, wherein R$^2$ represents a hydrocarbyl group, R$^3$ is a hydrocarbyl group which is the same as or different from R$^2$, X represents halogen, p and q denote $0 \leq p \leq 3$ and $0 \leq q \leq 3$, respectively, and $0 \leq p+q \leq 3$. R$^2$ and R$^3$, respectively, represent a hydrocarbyl group having 1 to ca. 20 carbon atoms, preferably a hydrocarbyl group having 1 to 10 carbon atoms. X preferably represents chlorine in consideration of its economy.

Specific examples of the silicon compound are (CH$_3$)Si(OCH$_3$)$_3$, (CH$_3$)Si(OC$_2$H$_5$)$_3$, (C$_2$H$_5$)$_2$Si(OCH$_3$)$_2$, (n-C$_6$H$_{11}$)Si(OCH$_3$)$_3$, C$_2$H$_5$Si(OC$_2$H$_5$)$_3$, (n-C$_{10}$H$_{21}$)Si(OC$_2$H$_5$)$_3$, Cl(CH$_2$)$_2$Si(OCH$_3$)$_3$, Si(OCH$_3$)$_4$, Si(OC$_2$H$_5$)$_3$Cl, (C$_2$H$_5$)$_2$Si(OC$_2$H$_5$)$_2$, (C$_{17}$H$_{35}$)Si(OCH$_3$)$_3$, Si(OC$_2$H$_5$)$_4$, $(C_6H_5)Si(OCH_3)_3$, $Si(OCH_3)_2Cl_2$, $(C_6H_5)_2Si(OCH_3)_2$, $(C_6H_5)(CH_3)Si(OCH_3)_2$, $(C_6H_5)Si(OC_2H_5)_3$, $(C_6H_5)_2Si(OC_2H_5)_2$, $(C_6H_5)(CH_3)Si(OC_2H_5)_2$, $(n-C_3H_7)Si(OC_2H_5)_3$, $(CH_3)Si(OC_3H_7)_3$, $(C_6H_5)CH_2Si(OC_2H_5)_3$,

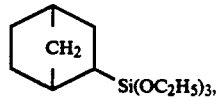

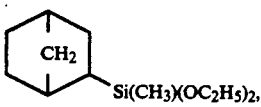

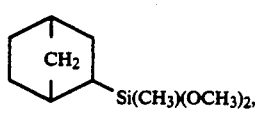

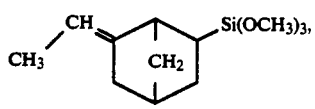

$(CH_3)_3CSi(CH_3)(OCH_3)_2$, $(CH_3)_3CSi(CH(CH_3)_2)(OCH_3)_2$, $(CH_3)_3CSi(CH_3)(OC_2H_5)_2$, $(C_2H_5)_3CSi(CH_3)(OCH_3)_2$, $(CH_3)(C_2H_5)CHSi(CH_3)(OCH_3)_2$, $((CH_3)_2CHCH_2)_2Si(OCH_3)_2$, $C_2H_5C(CH_3)_2Si(CH_3)(OC_2H_5)_2$, $(CH_3)_3CSi(OCH_3)_3$, $(CH_3)_3CSi(OC_2H_5)_3$, $(C_2H_5)_3CSi(OC_2H_5)_3$, and $(CH_3)(C_2H_5)CHSi(OCH_3)_3$.

Among these compounds, the preferred ones are the silicon compounds wherein $R^2$, of which the α-carbon is secondary or tertiary, represents a branched hydrocarbyl group having 3 to 20 carbon atoms, particularly $R^2$, of which the α-carbon is tertiary, represents a branched hydrocarbyl group having 4 to 10 carbon atoms.

(iii) Vinylsilane Compounds

Specific examples of the vinylsilane compounds are compounds having a structure in which at least one hydrogen atom in monosilane is replaced by vinyl ($CH_2=CH-$) and some of the remaining hydrogen atoms are replaced by halogen (preferably chlorine), alkyl (preferably that having 1 to 12 carbon atoms), alkoxy (preferably that having 1 to 12 carbon atoms), aryl (preferably phenyl) or the like, more specifically $CH_2=CH-SiH_3$, $CH_2=CH-SiH_2(CH_3)$, $CH_2=CH-SiH(CH_3)_2$, $CH_2=CH-Si(CH_3)_3$, $CH_2=CH-SiCl_3$, $CH_2=CH-SiCl_2(CH_3)$, $CH_2=CH-SiCl(CH_3)H$, $CH_2=CH-SiCl(C_2H_5)_2$, $CH_2=CH-Si(C_2H_5)_3$, $CH_2=CH-Si(CH_3)(C_2H_5)_2$, $CH_2=CH-Si(C_6H_5)(CH_3)_2$, $CH_2=CH-Si(CH_3)_2(C_6H_4CH_3)$, $CH_2=CH-Si(OCH_3)_3$, $CH_2=CH-Si(OC_2H_5)_3$, $CH_2=CH-Si(C_2H_5)(OCH_3)_2$, $CH_2=CH-Si(OC_2H_5)_2H$,

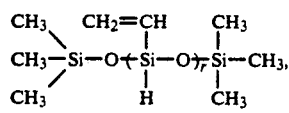

wherein r=10-20,

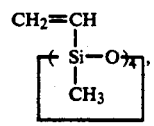

$(CH_2=CH)(CH_3)_2$-Si-O-Si$(CH_3)_2$(CH=CH_2)$, $(CH_2=CH)_2SiCl_2$, and $(CH_2=CH)_2Si(CH_3)_2$. Among these silane compounds, oxygen-free vinylsilanes are preferred and vinylalkyl silanes are more preferred.

(iv) Organoaluminum Compounds

The above mentioned organoaluminum compound is specifically represented by the formula $R^4{}_{3-s}AlX_s$ or $R^5{}_{3-t}Al(OR^6)_t$, wherein $R^4$ and $R^5$, which may be the same or different, represent a hydrocarbyl group having 1 to ca. 20 carbon atoms or a hydrogen atom, respectively, $R^6$ represents a hydrocarbyl group having 1 to 20 carbon atoms, X represents halogen, and s and t denotes a numeral in the range of $0 \leq s < 3$, and $0 \leq t < 3$, respectively.

Specific examples of the organoaluminum compound are (a) trialkylaluminum such as trimethylaluminum, triethylaluminum, tri-i-butylaluminum, trihexylaluminum, trioctylaluminum, and tridecylaluminum; (b) alkylaluminum halides such as diethylaluminum monochloride, diisobutylaluminum monochloride, ethylaluminum sesquichloride, and ethylaluminum dichloride; (c) alkylaluminum hydrides such as diethylaluminum hydride, and diisobutylaluminum; and (d) aluminum alkoxides such as diethylaluminum ethoxide, and diethylaluminum phenoxide. Among these compounds, triethylaluminum and triisobutylaluminum are preferred.

In addition to the organoaluminum compounds (a) to (d), other organometallic compounds such as the alkylaluminum alkoxide represented by the formula $R^7{}_{3-u}Al(OR^8)_u$, wherein u denotes a numeral in the range of $1 \leq u < 3$, and $R^7$ and $R^8$, which may be the same or different, represent a hydrocarbyl group having 1 to ca. 20 carbon atoms, respectively can also be used in combination. Examples are combinations of triethylaluminum and diethylaluminum ethoxide, diethylaluminum monochloride and diethylaluminum ethoxide, ethylaluminum dichloride and ethylaluminum diethoxide, and triethylaluminum, and diethylaluminum ethoxide and diethylaluminum chloride.

Preparation and Proportion of the Component ($A_2$)

Although the aforementioned essential three components and optional components may be used in any quantities as long as the meritorious effect of the present invention is recognized, they are preferably used in quantities specified below.

It is sufficient that the amount of the titanium compound used be in the range of $1 \times 10^{-4}$ to 1,000 by molar ratio to the amount of the magnesium compound used. Preferably, the amount of the titanium compound used is in a molar ratio of 0.01 to 10. When a compound for the titanium compound is used as the halogen source, the amount is preferably in the range of $1 \times 10^{-4}$ to 1,000, more preferably 0.1 to 100 by the molar ratio to the amount of the magnesium compound used without regard to the titanium compound and/or the magnesium compound containing or not containing halogen.

When the electron donor is used as an optional component, the amount of the electron donor used is in the range of $1 \times 10^{-3}$ to 10, preferably 0.01 to 5 by molar ratio to the amount of the aforementioned magnesium compound used.

When the silicon compound is used as an optional component, the amount of the silicon compound used is in the range of 0.01 to 1,000, preferably 0.1 to 100 by atomic ratio of the silicon of the silicon compound to the titanium component constituting the component ($A_2$) (silicon/titanium). When the vinylsilane compound is used as an optional component, the amount of the vinylsilane compound used is in the range of 0.001 to 1000, preferably 0.01 to 300 by molar ratio to the amount of the silicon of the vinylsilane compound to the titanium component constituting the component ($A_2$) (silicon/titanium). When the organoaluminum compound is used as an optional component, the amount of the organoaluminum compound used is in the range of 0.01 to 100, preferably 0.1 to 30 by the molar ratio to the amount of the aluminum of the organoaluminum component to the titanium compound constituting the component ($A_2$) (aluminum/titanium).

Preparation of the Component (A)

The component (A) is the product obtained by the contact of the aforementioned components ($A_1$) and ($A_2$). Although any contact condition of the components ($A_1$) and ($A_2$) can be used as long as the meritorious effect of the present invention is recognized, the following condition is generally preferred. The contact temperature is in the range of $-50°$ to ca. $200°$ C., preferably $0°$ to $100°$ C. These components are ordinarily contacted by stirring them in the presence of an inert medium. As the inert medium, any of aliphatic and aromatic hydrocarbons, halogenated hydrocarbons and the like can be used in this case.

Although the components ($A_1$) and ($A_2$) can be contacted in any proportion as long as the meritorious effect of the present invention is recognized, the following ratio is generally preferred. The quantitative ratio of the magnesium compound in the components ($A_1$) and ($A_2$) is in such a range that the weight ratio of the magnesium compound is in a proportion of 10 to 200% by weight, preferably 50 to 100% by weight to the weight of the component ($A_1$).

The components ($A_1$) and ($A_2$) can be contacted by any method provided that the meritorious effect of the present invention is recognized. Specific examples of the method for contacting are as follows.

(a) A method wherein a solution of a magnesium halide and a titanium tetraalkoxide is contacted with the component ($A_1$), and a specific polymeric silicon compound is treated to contact therewith a titanium or magnesium halide.

As the polymeric silicon compound, a compound represented by the following formula can be used.

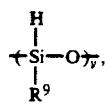

wherein $R^9$ represents a hydrocarbyl group having 1 to ca. 10 carbon atoms, and v denotes a polymerization degree such that the polymeric silicon compound has a viscosity in the range of 1 to 100 cSt.

Specifically, methylhydrogenpolysiloxane, ethylhydrogenpolysiloxane, phenylhydrogenpolysiloxane, cyclohexylhydrogenpolysiloxane, 1,3,5,7-tetramethylcyclotetrasiloxane, 1,3,5,7,9-petamethylcyclopentanesiloxane or the like is preferred.

(b) A method according to the above paragraph (a) wherein the component ($A_1$) is contacted after the specific polymeric silicon compound has been contacted.

(c) A method wherein a magnesium halide and a titanium tetraalkoxide is contacted with the component ($A_1$) which as been preliminarily contacted with the specific polymeric silicon compound.

(d) A method wherein a magnesium compound which has been dissolved in a titanium tetraalkoxide and an electron donor is contacted with the component ($A_1$) and then contacted with a halogenating agent or a titanium halide.

(e) A method according to the above paragraph (d), wherein the component ($A_1$) is contacted after a halogenating agent or a titanium halide has been contacted.

f) A method wherein a solution of a magnesium compound, titanium tetraalkoxide and an electron donor is contacted after the component ($A_1$) and a halogenating agent or a titanium halide compound have been contacted.

Among these methods, method (a), (d) and (f) are preferred.

In this connection, the concentration of the magnesium compound in the component ($A_2$) relative to an inert diluent is 50 g/liter or more, preperably in the range of 100 g/liter to 1,000 g/liter, particularly in the range of 150 g/liter to 500 g/liter. The atomic ratio of silicon to the titanium component which constitutes the component ($A_2$) (silicon/titanium) is in the range of 0.01 to 1,000, preferably 0.1 to 100.

Treatments with the aforementioned optional components can be carried out in the above described preparation process of the Ziegler type catalyst used in the present invention.

Component (B)

The aforementioned component (B) is an organoaluminum compound. Specific examples of the organoaluminum compound as the component (B) can be found in the illustrations of the organoaluminum compounds described as the optional components in the preparation of the aforementioned component (A). Among these illustrations, the preferred examples are trialkylaluminum such as triethylaluminum and triisobutylaluminum. The amount of the component (B) used is in the range of 0.01 to 1,000, preferably 0.1 to 100 as the weight ratio of the component (B)/component (A).

[II] USE OF THE CATALYST/POLYMERIZATION

Introduction

The catalyst according to the present invention is of course applicable to the conventional slurry polymerization, but it is also to the liquid phase solvent-free polymerization which uses substantially no solvent, the solution polymerization and the vapor phase polymerization. It is also applicable to continuous polymerization, batchwise polymerization or preliminary polymerization. As the polymerization solvent for slurry polymerization, saturated aliphatic or aromatic hydrocarbons such as hexane, heptane, pentane, cyclohexane, benzene, and toluene are used alone or as a mixture thereof. The polymerization temperature is in the range of room temperature to ca. 200° C., preferably 50° to 150° C. The polymerization pressure is in the range of atmospheric pressure to ca. 300 Kg/cm², preferably atmospheric pressure to 50 Kg/cm². Hydrogen can be used additionally as a molecular weight modifier in this case.

In the case of slurry polymerization, the amount of the component (A) used is preferably in the range of 0.001 to 0.1 g of the component (A)/liter of solvent.

The α-olefin polymerized with the catalyst of the present invention is represented by the formula $R^{10}$—CH=CH$_2$, wherein $R^{10}$ represents a hydrogen atom or a hydrocarbyl group having 1 to 10 carbon atoms and may have a branched group. Specific examples of the α-olefin include ethylene, propylene, butene-1, pentene-1, hexene-1, and 4-methylpentene-1, preferably ethylene and propylene. In addition to the homopolymerization of the α-olefins, copolymerization of, for example, ethylene with one of the aforementioned olefins in a proportion of 50% by weight or less, preferably 20% by weight or less to ethylene can be carried out, and the copolymerization of propylene with one of the aforementioned olefins, particularly ethylene, in a proportion of 30% by weight to propylene can be carried out. Copolymerization of the α-olefin with other copolymerizable monomers such as vinyl acetate and diolefins can also be conducted. According to the present invention, a polymer having a good particle size such as that in the range of 0.5 to ca. 5 mm of the average particle diameter can be prepared as the product of the polymerization process.

Block Copolymerization

The catalyst according to the present invention can be used in a variety of polymerizations of various α-olefins as described above, and a granular polymer can be obtained directly as the product of the polymerization process. The catalyst of the present invention, as described above, is particularly useful for the block copolymerization for preparing a thermoplastic elastomer by producing "in situ" a rubber-like polymer.

The block copolymerization of the α-olefins, preferably the block copolymerization of ethylene and propylene is generally conducted by vapor phase polymerization in which substantially no solvent is used. Thus, the copolymerization process in the vapor phase polymerization which is conducted in the presence of the catalyst components of the present invention comprises at least two steps, namely, step (1) and step (2). While either of the steps (1) or (2) may be carried out first, it is advantageous industrially to conduct the process in sequence [(1)→(2)]. These steps are carried out in the presence of substantially no solvent. In any case, these steps are conducted according to the ordinary method for preparing a block copolymer. The second step is conducted in the presence of at least a part of the product in the first step.

Formation of the Catalyst

The catalyst according to the present invention is formed by contacting the aforementioned catalyst components (A) and (B) at the same time or stepwise in or outside a polymerization system. The catalyst may be additionally supplied in respective steps, and the second step can be conducted by additionally supplying the component (B).

Polymerization Step (1)

In the polymerization step (1), propylene alone or a propylene/ethylene mixture is supplied to a polymerization system containing the aforementioned catalyst components and polymerized in one step or in a plurarity of steps to form a propylene homopolymer or a propylene-ethylene copolymer in an amount of 7% by weight or less, preferably 0.5% by weight or less, corresponding to 20 to 80% by weight of the total polymerization amount.

If the ethylene content in the propylene-ethylene copolymer exceeds 7% by weight in the polymerization step (1), the bulk density of the final copolymer is lowered and the amount of a low crystalline polymer as a by-product is increased extensively. If the polymerization ratio is less than the lower limit of the aforementioned range, the amount of a low crystalline polymer by-product is also increased.

The polymerization temperature in the polymerization step (1) is in the range of 30° to 95° C., preferably 50° to 85° C. The polymerization pressure is generally in the range of 1 to 50 Kg/cm². In the polymerization step (1), it is preferable to control MFR with a molecular weight modifier such as hydrogen and to maintain the high melt fluidity of the final copolymer.

Polymerization step (2)

In the polymerization step (2), a propylene-ethylene copolymer is polymerized in one step or in a plurality of steps to produce a rubber-like copolymer of propylene having a polymerization ratio (weight ratio) of propylene-ethylene in the range of 70/30 to 30/70. In this connection, the polymerization amount in this step corresponds to 80 to 20% by weight of the total polymerization amount.

In the polymerization step (2), the coexistence of the other comonomers causes no problem. α-Olefins such as 1-butene, 1-pentene, 1-hexene or the like can be used. The polymerization temperature of the polymerization step (2) is in the range of 30° to 90° C., preferably 50° to 80° C. The polymerization pressure in the range of 1 to 50 Kg/cm² is generally used.

When the polymerization step (1) is turned into the polymerization step (2), it is preferable to purge the propylene gas or the propylene-ethylene mixed gas and a hydrogen gas before starting the subsequent step.

The polymerization step (2) may be conducted with or without a molecular weight modifier depending on the objects. The propylene copolymer prepared by the polymerization described above has a content of a rubber-like copolymer (xylene-soluble fraction at 20° C.) in the range of 20 to 70% by weight, preferably 35 to 60% by weight.

EXAMPLE 1

Preparation of the Component (A$_1$)

Into a 2000 ml glass flask was fed 20 g of polypropylene powder having a pore volume of 0.0743 cc/g with a pore diameter in the range of 100 to 5,000 Å, an average pore diameter of 160 Å and an average particle diameter of the powder particle in the range of 210 to 300 μm as measured with a porosimeter. Next, 320 ml of n-heptane, 1,280 ml of n-octane and 1 g of boiling tips were added, and the mixture was heated with stirring to the boiling point of the above described mixed solvent. The mixed solvent was taken out at 15 minutes after the temperature reached the boiling point, and the polypropylene powder was dried under a nitrogen stream.

Porous polypropylene powder appropriate for the objects of the present invention having a pore volume of 0.9741 cc/g with a pore diameter in the range of 100 to 5,000 Å, an average pore diameter of 1,500 Å and an average particle diameter of the powder particle in the range of 210 to 300 μm as measured with a porosimeter was obtained by this extraction operation [component ($A_1$)]. The component ($A_1$) in an amount of 3 g was added to 200 ml of purified toluene and heated at 70° C., whereby the component ($A_1$) was completely dissolved.

Production of the Component A

Into a flask which had been prepared separately and sufficiently purged with nitrogen was fed 25 ml of dehydrated and deoxygenated n-heptane, which was followed by 5 g of $MgCl_2$ and 40 ml of $Ti(O-nC_4H_9)_4$, and the mixture was reacted at 95° C. for 1 hour. After the reaction was completed, the mixture was cooled to a temperature of 40° C. Then 10 g of the component ($A_1$) (porous polypropylene powder) which had been preliminarily prepared was fed. Thereafter 8 ml of methylhydropolysiloxane was fed after stirring for 30 minutes, and the mixture was reacted for 3 hours. The resulting solid component was washed with n-heptane.

Then, 25 ml of n-heptane was added, and 6 ml of $SiCl_4$ was added dropwise at 30° C. over a period of 30 minutes. The mixture was reacted at 90° C. for 2 hours. The solid component obtained was washed with n-heptane.

Next, 25 ml of $TiCl_4$ was fed at 30° C., and the mixture was reacted at 110° C. for 3 hours. After the reaction was completed, the mixture was washed with n-heptane. $TiCl_4$ which had not been supported on the polypropylene powder was removed to produce the component (A). The amount of the component ($A_2$) supported was 8.7% by weight.

Polymerization of Propylene

Into a 1.5 liter stainless steel autoclave equipped with a stirrer and a temperature control unit were fed 500 ml of sufficiently dehydrated and deoxygenated n-heptane, 125 mg of triethylaluminum as the component (B), 26.8 mg of diphenyldimethoxysilane. 100 mg of the component (A) prepared as described above and 60 ml of hydrogen. After the temperature and the pressure were raised, the mixture was subjected to polymerization under the condition of a polymerization pressure of 5 Kg/cm²G, a polymerization temperature of 75° C. and a polymerization time of 2 hours. After the polymerization was completed, the polymer slurry thus obtained was separated by filtration, and the polymer was dried. As a result, the polymer was obtained in a yield of 90.2 g.

Also, the polymer was obtained in a yield of 0.19 g from the filtrate. From the result of the boiling heptane extraction test, the polymer had a total product I.I (referred to hereinafter as T-I.I) of 99.1 % by weight, an MFR of 2.5 g/10 minutes and a bulk density of 0.34 g/cc. The average particle diameter of the polymer was 2.3 mm (the average particle diameter of the polymer was measured with a SPIKA II manufactured by NIPPON AVIONICS (as were the average particle diameters of the polymers in the following examples).

EXAMPLE 2

Preparation of the Component ($A_1$)

The porous polypropylene powder used in Example 1 was used.

Production of the Component (A)

After the treatment with $TiCl_4$ in the same manner as in Example 1 (25 ml of $TiCl_4$ fed at 30° C. and reacted at 110° C. for 3 hours), 0.5 ml of trimethylvinylsilane as the vinylsilane compound, 0.5 ml of $(CH_3)_3CSi(CH_3)(OCH_3)_2$ as the silicon compound and 1.7 ml of triethylaluminum as the organoaluminum compound were fed, and the mixture was reacted at 30° C. for 2 hours. After the contact was completed, the mixture was amply washed with n-heptane, and the materials which had not been supported on the polypropylene powder were removed to obtain the component (A). The amount of the component ($A_2$) supported was 9.9% by weight.

Polymerization of Propylene

The same conditions as in the polymerization of propylene in Example 1 were employed except that diphenyldimethoxysilane was not used. As a result, the polymer was obtained in a yield of 98.4 g with a T-I.I=99.1 % by weight, an MFR=2.0 g/10 minutes, a polymer bulk density=0.36 g/cc and an average particle diameter=2.3 mm.

EXAMPLE 3

The production of the component (A) was conducted as in Example 2 except that in the component ($A_1$), a polypropylene powder having a pore volume of 0.2116 cc/g with a pore diameter in the range of 100 to 5,000 Å, an average pore diameter of 1,300 Å and an average particle diameter of the powder particle in the range of 210 to 300 μm was used. The polymerization of propylene was conducted in the same manner as above. The amount of the component ($A_2$) supported was 5.4% by weight.

As a result, the polymer was obtained in a yield of 56.0 g with a T-I.I=99.0% by weight, an MFR=2.7 g/10 minutes, a polymer bulk density=0.224 g/cc and an average particle diameter=2.0 mm.

COMPARATIVE EXAMPLE 1

The production of the component (A) was conducted as in Example 2 except that in the component ($A_1$), a polypropylene powder having a pore volume of 0.074 cc/g with a pore diameter in the range of 100 to 5,000 Å, an average pore diameter of 160 Å and an average particle diameter of the powder particle in the range of 210 to 300 μm was used. The polymerization of propylene was conducted in the same manner as above. The amount of the component ($A_2$) supported was 1.3% by weight.

As a result, the polymer was obtained in a yield of 12.2 g with a T-I.I=99.1% by weight, an MFR=3.3 g/10 minutes, a polymer bulk density=0.290 g/cc and an average particle diameter=1.3 mm.

EXAMPLE 4

The production of the component (A) was conducted as in Example 2 except that in the component ($A_1$), polypropylene powder having a pore volume of 0.9971 cc/g with a pore diameter in the range of 100 to 5,000

Å, an average pore diameter of 1,500 Å and an average particle diameter of the powder particle in the range of 150 to 210 μm was used. The polymerization of propylene was conducted in the same manner as above. The amount of the component ($A_2$) supported was 10.8% by weight.

As a result, the polymer was obtained in a yield of 96.3 g with a T-I.I=99.1% by weight, an MFR=1.6 g/10 minutes, a polymer bulk density=0.350 g/cc and an average particle diameter=1.7 mm.

EXAMPLE 5

The production of the component (A) was conducted as in Example 2 except that in the component ($A_1$), polypropylene powder (trade name: ACCUREL, manufactured by AKZO) having a pore volume of 2.5419 cc/g with a pore diameter in the range of 100 to 5,000 Å, an average pore diameter of 4,000 Å and an average particle diameter of the powder particle in the range of 210 to 300 μm was used. The amount of the component ($A_2$) supported was 15.6% by weight. The polymerization of propylene was conducted as described above except that 50 mg of the component prepared in the above manner was fed.

As a result, the polymer was obtained in a yield of 131.3 g with a T-I.I=99.1% by weight, an MFR=2.4 g/10 minutes, a polymer bulk density=0.290 g/cc and an average particle diameter=3.5 mm.

EXAMPLE 6

Production of the Component (A)

The component (A) was produced in the same manner as in Example 2.

Polymerization of Propylene

After the air within the polymerizer of a stainless steel autoclave having an internal volume of 1.5 liter and equipped with a stirrer and a temperature control unit was replaced by amply refined nitrogen, 30 g of a polymer support which had been amply dehydrated and deoxygenated was added, and 50 mg of triethylaluminum and 200 mg of the component (A) synthesized as described above were fed. In the first polymerization step (1), after 60 ml of hydrogen was fed, the mixture was heated to a temperature of 75° C., and propylene was fed into the polymerizer via a gas counter to ensure that propylene was maintained at a pressure of 9 Kg/cm².G.

The mixture was stirred at a rate of 350 rpm. When the polymerization amount reached 80 g (calculated by the counter), the feeding of propylene was stopped, and propylene and residual hydrogen gas were purged until the pressure within the polymerizer was reduced to atmospheric pressure. Subsequently, after the temperature was raised to 70° C., 100 ml of $H_2$ was added and the polymerization step (2) was initiated. In the second polymerization step, a mixed gas of propylene and ethylene mixed at a molar ratio of 1:1 was fed to ensure that the pressure within the polymerizer was maintained at 5 Kg/cm².G.

When the polymerization amount of the copolymer of propylene and ethylene reached about 80 g (calculated by the counter), the feeding of the mixed gas of propylene and ethylene was stopped to complete the copolymerization.

When the monomers were purged and the polymer was taken out, a copolymer in an amount of 147 g was obtained. The polymer thus obtained had an MFR of 2.5 g/10 minutes, a polymer bulk density (B.D) of 0.37 (g/cc), an average particle diameter of 2.3 mm and a polymer dropping rate of 5.2 seconds. The rubber-like copolymer had a weight of 47.4% by weight. In this connection, the term polymer dropping rate means the time required for the drop of 50 g of a polymer.

EXAMPLE 7

Production of the Component (A)

The procedure set forth in Example 1 was followed until the step of $SiCl_4$ treatment. The solid product obtained was thoroughly washed with n-heptane.

In place of the $TiCl_4$ treatment which was applied to the solid product in Example 1, the solid product was subjected to a treatment with phthalic chloride in that 0.47 ml of phthalic chloride was added at 90° C. to the solid product, followed by a reaction at 90° C. for 1 hour. After the reaction, the solid product was washed thoroughly with n-heptane. To the solid product was added 5 ml of $SiCl_4$ at 30° C., followed by a reaction at 90° C. for 2 hours, was also added 0.5 ml of trimethylvinylsilane, followed by a reaction at 90° C. for 1 hour. To the reaction product, after cooled to 30° C., was added 0.8 ml of $(CH_3)CSi(CH_3)(OCH_3)_2$ and then 2.2 g of trimethylaluminum, followed by a contact at 30° C. for 2 hours. After the contact, the product was washed thoroughly with n-heptane thereby to remove the catalytic component not supported on the polypropylene powder to form the component (A).

The content of the component ($A_2$) in the component (A) was 10.8% by weight.

Polymerization of Propylene

The procedure set forth in Example 2 was followed. A polymer in an amount of 147.6 g was obtained, which had a total I.I. of 99.3% by weight, an MFR of 1.7 g/10 min., a polymer bulk density of 0.37 g/cc and an average particle size of 2.7 mm.

COMPARATIVE EXAMPLE 2

Production of the Component (A)

In place of the polypropylene powder used in Example 2 was used as the component ($A_1$) "Chromosorb 101" which was a porous styrene-divinylbenzene particulate polymer of an average particle size of 200 μm and a pore volume between the pore size of 75 Angstrom and 5000 Angstrom upon porosimeter determination of 0.88 cc/g manufactured by Johus Manville to prepare the component (A). The content of the component ($A_2$) in the component (A) was 5.5% by weight.

Polymerization of Propylene

The procedure set forth in Example 2 was followed. A polymer in an amount of 43 7 g was obtained, which had a total I.I. of 98.7% by weight, an MFR of 2.2 g/10 min., a polymer bulk density of 0.27 g/cc and an average particle size of 1.9 mm.

The olefin polymerization catalyst of the present invention is, as described in SUMMARY OF THE INVENTION, a catalyst in which the use of a polyolefin powder having an amply large pore volume as the support for catalyst improves the supporting state of the catalyst and produces a contaminant-free polymer having a satisfactorily large particle diameter without the lowering of the activity or the stereoregularity of the catalyst containing particles for support, the polymer having a amply large particle diameter which makes possible the elimination of the granulation step from the post-polymerization treatment process and is capable of increasing the content of a rubber-like copolymer in the production of a propylene block copolymer.

We claim:

1. An olefin polymerization catalyst which is capable of producing an olefin polymer having an average particle diameter in the range of 0.5 to approximately 5 mm and being free of gel and which is obtained by contacting the following components (A) and (B):

component (A), which is a product obtained by contacting the following components (A$_1$) and (A$_2$):

component (A$_1$), which is a powder of a polymer of an α-olefin having 2 to 10 carbon atoms, said powder having a pore diameter distribution in the range of 100 to 5,000 Å, a pore volume in the range of 0.5 to 2.5 cc/g, an average pore diameter in the range of 500 to 3,000 Å as measured with a porosimeter and an average particle diameter in the range of 100 to 700 μm, and being completely soluble in toluene at 70° C., component (A$_2$), which is a solid component for an olefin polymerization catalyst containing titanium, magnesium and a halogen as the essential components, component (B), which is an organoaluminum compound.

2. The olefin polymerization catalyst as claimed in claim 1, wherein said α-olefin is ethylene, propylene or mixtures thereof.

3. The olefin polymerization catalyst as claimed in claim 1, wherein said polymer of an α-olefin is a propylene homopolymer.

4. The olefin polymerization catalyst as claimed in claim 1, wherein the component (A$_2$) has titanium supplied by a titanium compound selected from the group consisting of the compounds represented by the formula Ti(OR$^1$)$_{4-n}$X$_n$, wherein R$^1$ represents a hydrocarbyl group having 18 to 10 carbon atoms, X represents halogen and n denotes a numeral defined as $0 \leq n \leq 4$, and molecular compounds obtained by reacting a TiX'$_4$, wherein X' represents halogen, with an electron donor.

5. The olefin polymerization catalyst as claimed in claim 1, wherein the component (A$_2$) has magnesium supplied by a magnesium compound selected from the group consisting of a magnesium halide, a dialkoxymagnesium, an alkoxymagnesium halide, a magnesium oxyhalide, a dialkylmagnesium, magnesium oxide, magnesium hydroxide and a magnesium carbonate.

6. The olefin polymerization catalyst as claimed in claim 1, wherein the component (A$_2$) has halogen supplied by the halogen of the titanium supplying source compound, the magnesium supplying source compound which contain halogen or mixtures thereof.

7. The olefin polymerization catalyst as claimed in claim 1, wherein the component (A$_2$) consists essentially of the following components used in the preparation thereof:

(i) a solid component for an olefin polymerization catalyst containing as its essential components titanium, magnesium and a halogen;

(ii) a silicon compound of the formula $R^2_p X_q Si(OR^3)_{4-p-q}$, wherein R$^2$ and R$^3$ are each a hydrocarbyl group of 1 to 20 carbon atoms, X is a halogen atom, $0 \leq p \leq 3$, $0 \leq q \leq 3$ and $0 \leq p+q \leq 3$;

(iii) a vinylsilane compound; and (iv) an organoaluminum compound.

8. The olefin polymerization catalyst as claimed in claim 1, wherein the component (A$_2$) consists essentially of the following components used in the preparation thereof:

(i) a solid component for an olefin polymerization catalyst containing as its essential components titanium, magnesium and a halogen;

(ii) an electron donor;

(iii) a silicon compound of the formula $R^2_p X_q Si(OR^3)_{4-p-q}$ wherein R$^2$ and R$^3$ are each a hydrocarbyl groups of 1 to 20 carbon atoms, X is a halogen atom, $0 \leq p \leq 3$, $0 \leq q \leq 3$ and $0 \leq p+q \leq 3$;

(iv) a vinylsilane compound; and (v) an organoaluminum compound.

9. The olefin polymerization catalyst as claimed in claim 7, wherein the electron donor is selected from the group consisting of an organic acid ester and an acid halide.

10. The olefin polymerization catalyst as claimed in claim 7, wherein the silicon compound contains a branched hydrocarbyl group R$^2$ of 3 to 20 carbon atoms, of which the α-carbon is secondary or tertiary.

11. The olefin polymerization catalyst as claimed in claim 7, wherein the vinylsilane compound is a compound having a structure wherein at least one of the hydrogen atoms in a monosilane is replaced by a vinyl group and some the remaining hydrogen atoms are replaced by halogen, alkoxy and/or aryl.

12. The olefin polymerization catalyst as claimed in claim 7, wherein the organoaluminum compound is represented by the formulae, R$^4_{3-s}$AlX$_s$ and/or R$^5_{3-t}$Al(OR$^6$)$_t$, wherein R$^4$ and R$^5$, each, represents a hydrocarbyl group of 1 to 20 carbon atoms or a hydrogen atom, R$^6$ represents a hydrocarbyl group of 1 to 20 carbon atoms, s and t denotes a numeral defined as $0 \leq s < 3$ and $0 < t < 3$, respectively.

13. The olefin polymerization catalyst as claimed in claim 4, wherein the organoaluminum compound of the component (B) is a trialkylaluminum.

14. The olefin polymerization catalyst as claimed in claim 1, wherein the component (A$_1$) has undergone an extraction with a hydrocarbon solvent.

15. An olefin polymerization catalyst which comprises:

component (A), which is a product of contacting the component (A$_1$) as specified in claim 1 and the component (A$_2$) which is prepared by a method which is either one of:

(a) a method wherein a solution of a magnesium halide and a titanium tetraalkoxide is contacted with the component (A$_1$), and a polymeric silicon compound is contacted therewith, the polymeric silicon compound being represented by a formula:

$$\left(\begin{array}{c} H \\ | \\ Si-O \\ | \\ R^9 \end{array}\right)_r,$$

wherein $R^9$ represents a hydrocarbyl group having 1 to 10 carbon atoms, and v denotes a polymerization degree such that the polymeric silicon compound has a viscosity in the range of 1 to 100 cSt;

(b) a method according to the paragraph (a) above wherein the component ($A_1$) is contacted after the polymeric silicon compound has been contacted;

(c) a method wherein a magnesium halide and a titanium tetraalkoxide is contacted with the component ($A_1$) which has been preliminarily contacted with the polymeric silicon compound specified in the paragraph (a) above;

(d) a method wherein a magnesium compound which has been dissolved in a titanium tetraalkoxide and an electron donor is contacted with the component ($A_1$) and then contacted with a halogenating agent or a titanium halide;

(e) a method according to the paragraph (d) above, wherein the component ($A_1$) is contacted after a halogenating agent or a titanium halide has been contacted; and (f) a method wherein a solution of a magnesium compound, titanium tetraalkoxide and an electron donor is contacted after the component ($A_1$) and a halogenating agent or a titanium halide compound have been contacted, and component (B), which is an organoaluminum compound.

16. The olefin polymerization catalyst as claimed in claim 15, wherein the component (A) is prepared by a method which is the method (a), (d) or (f) wherein the component ($A_2$) forms deposits on the component ($A_1$).

* * * * *